(12) United States Patent
Robertson et al.

(10) Patent No.: US 6,367,588 B1
(45) Date of Patent: Apr. 9, 2002

(54) DECELERATION SENSOR FOR AN ELECTRIC BRAKE CONTROLLER

(75) Inventors: Charles L. Robertson, Horton, AL (US); Michael A. Hedding, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/553,292

(22) Filed: Apr. 20, 2000

(51) Int. Cl.[7] ............................................. F16D 66/00
(52) U.S. Cl. ..................... 188/1.11 E; 303/7; 303/20; 303/24.1
(58) Field of Search .................. 303/20, 24.1, 9.68, 303/7; 188/112 R, 3 R, 1.11 E, 139, 158; 33/366.24; 73/519.01

(56) References Cited

U.S. PATENT DOCUMENTS

| 3,908,782 A | | 9/1975 | Lang et al. | |
| 4,030,756 A | * | 6/1977 | Eden | 303/9.68 |
| 4,103,842 A | * | 8/1978 | Martin et al. | 188/139 |
| 4,196,936 A | | 4/1980 | Snyder | |
| 4,571,844 A | * | 2/1986 | Komasaku et al. | 33/366.24 |
| 4,721,344 A | * | 1/1988 | Frait et al. | 303/20 |
| 4,726,627 A | | 2/1988 | Frait et al. | |
| 4,849,655 A | | 7/1989 | Bennett | |
| 5,058,960 A | * | 10/1991 | Eccleston et al. | 303/24.1 |
| 5,333,948 A | * | 8/1994 | Austin et al. | 303/24.1 |
| 5,495,762 A | * | 3/1996 | Tamura et al. | 73/519.01 |

* cited by examiner

Primary Examiner—Douglas C. Butler
Assistant Examiner—Melanie Torres
(74) Attorney, Agent, or Firm—MacMillan, Sobanski & Todd, LLC (57) ABSTRACT

A decration sensor includes a pendulum which is suspended within an U-shaped bucket. The pendulum carries a permanent magnet which is adjacent to a Hall Effect device mounted upon the bucket. Both the pendulum and bucket are carried in an open ended housing which permits movement of the bucket relative to the pendulum to adjust for surface angles when the sensor is mounted upon a vehicle. Upon the deceleration of the vehicle, the pendulum move relative to the Hall Effect Device. As a result of the changing magnetic field, a voltage is generated by the Hall Effect Device which is directly proportional to the vehicle deceleration.

20 Claims, 5 Drawing Sheets

DECELERATION SENSOR FOR AN ELECTRIC BRAKE CONTROLLER

BACKGROUND OF THE INVENTION

This invention relates in general to controllers for electric trailer brakes and in particular to a deceleration sensor for an electric brake controller.

Towed vehicles, such as recreational and utility trailers adapted to be towed by automobiles and small trucks, are commonly provided with electric brakes. The electric brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric brakes on a two wheeled trailer can draw six amperes of current when actuated and the electric brakes on a four wheeled trailer can draw 12 amperes of current.

Automotive industry standards require that electrically-actuated vehicle brakes be driven against the ground potential of the vehicle power supply. Accordingly, one end of each of the towed vehicle brake electromagnets is electrically connected to the towed vehicle ground and the towed vehicle ground is electrically connected to the towing vehicle ground. The other end of each of the brake electromagnets is electrically connected through an electric brake controller to the towing vehicle power supply.

Various electric brake controllers for towed vehicle electric brakes are known in the art. For example, a variable resistor, such as a rheostat, can be connected between the towing vehicle power supply and the brake electromagnets. The towing vehicle operator manually adjusts the variable resistor setting to vary the amount of current supplied to the brake electromagnets and thereby control the amount of braking force developed by the towed vehicle brakes. An example of such a controller is disclosed in U.S. Pat. No. 3,740,691.

Also known in the art are more sophisticated electric brake controllers which include electronics to automatically supply current to the brake electromagnets when the towing vehicle brakes are applied. Such electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. One such sensing unit is disclosed in U.S. Pat. No. 4,726,627. Alternately, the hydraulic pressure of the brake fluid in the towing vehicle's braking system or the pressure applied by the driver's foot to the towing vehicle's brake pedal can be sensed to generate the brake control signal. A pressure transducer for sensing the brake fluid pressure is disclosed in U.S. Pat. No. 4,279,162, while a brake pedal pressure sensor is disclosed in U.S. Pat. No. 4,380,002.

Known electronic brake controllers also usually include an analog pulse width modulator. The input of the pulse width modulator is electrically connected to the sensing unit and receives the brake control signal therefrom. The pulse width modulator is responsive to the brake control signal for generating an output signal comprising a fixed frequency pulse train. The pulse width modulator varies the duty cycle of the pulse train in proportion to the magnitude of the brake control signal. Thus, the duty cycle of the pulse train corresponds to the amount of braking effort desired.

Electronic brake controllers further include an output stage which is electrically connected to the output of the pulse width modulator. The output stage typically has one or more power transistors which are connected between the towing vehicle power supply and the towed vehicle brake electromagnets. The power transistors function as an electronic switch for supplying electric current to the towed vehicle brakes.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal. A typical electronic brake controller is disclosed in U.S. Pat. No. 4,721,344.

Recently, microprocessors have been incorporated into electronic brake controllers. The microprocessor replaces the analog pulse width modulator described above. The microprocessor is connected directly to the controller output stage and switches the output transistors between their on and off states as a function of the brake control signal. Such a unit is disclosed in U.S. Pat. No. 5,620,236.

SUMMARY OF THE INVENTION

This invention relates to a deceleration sensor for an electric brake controller.

As described above, it is known to use a pendulum device to generate a brake control signal which is proportional to the deceleration of a towing vehicle. Because the pendulum rest position is determined by gravity, it is necessary to level the pendulum when the controller is mounted upon a vehicle dashboard in a nonhorizontal position. Accordingly, it would be desirable to provide a structure for supporting the pendulum that would allow a maximum amount of adjustment to compensate for a variety of mounting positions.

The present invention contemplates a device for sensing the deceleration of a vehicle which includes a housing adapted to be secured to the vehicle. The housing includes a pair of spaced apart supporting members with a U-shaped bucket suspended between the housing support members and pivotable about an axis. A pendulum is suspended within the bucket and also pivotable about the same axis. A positioning device is carried by the housing and connected to the bucket. In the preferred embodiment, the positioning device includes a crank which is connected to the bucket and operable to rotate the bucket relative to the housing. The positioning device is operable to rotate the bucket about the axis relative to the housing in either a forward or a rearward direction with the bucket being rotatable sufficiently in either the forward or rearward direction such that at least of portion of the bucket extends beyond both of housing supporting members.

At least one of the housing support members has a recess formed therein, the recess receiving a portion of the crank whereby the amount of rotation of the bucket about the pivot pin is increased over prior art sensor designs. The housing further includes a cross member supported by a pair of arms which extend from the housing support members. The cross member is urged by the arms against a portion of the bucket such that the bucket is frictionally retained in a particular position relative to the housing.

It is also contemplated that the device includes a carrier mounted upon the bucket, the carrier having a slot formed therein which slidingly receives and frictionally retains a Hall Effect Device. The end of the pendulum opposite from the pivot carries a permanent magnet. The permanent magnet cooperates with the Hall Effect Device upon movement of the pendulum to cause the Hall Effect Device to generate a voltage which is proportional to the deceleration of the vehicle.

In the preferred embodiment, the device is included in an electric brake controller installed upon a towing vehicle. The voltage generated by the Hall Effect Device upon deceleration of the towing vehicle is utilized by the brake controller as a brake control signal for controlling a set of electric wheel brakes mounted upon a towed trailer. The electric brake controller can have an outer housing with the device mounted inside the outer housing. In such a case, the outer housing has an aperture formed therethrough with an end of the crank extending through the outer housing aperture. An adjustment lever is formed upon the extended end of the crank. A vehicle operator can manipulate the adjustment lever to move the bucket relative to the housing in order to position of the Hall Effect Device relative to the pendulum magnet.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
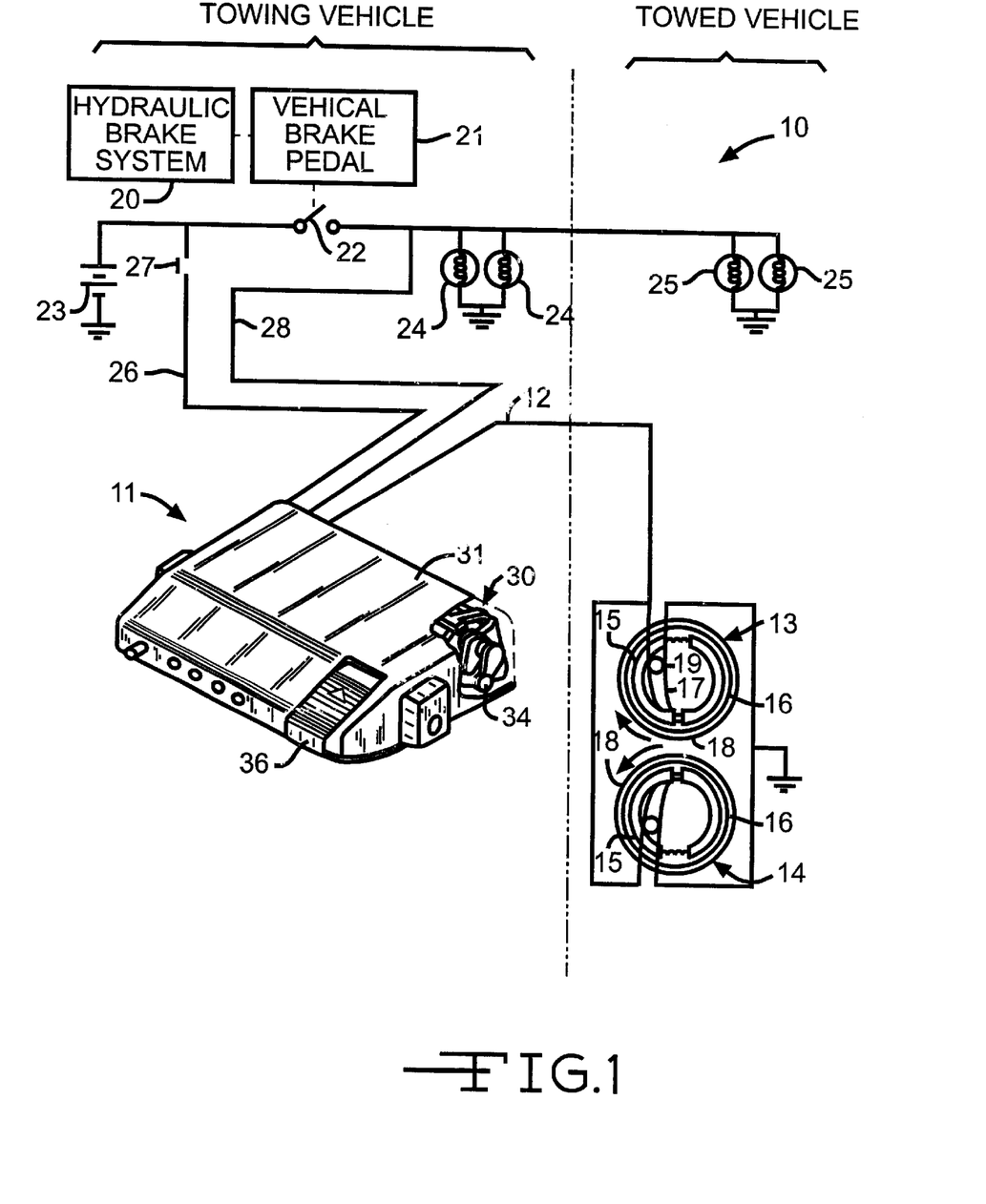
FIG. 1 is schematic diagram illustrating an electric trailer brake system which includes an electronic trailer brake controller.
Figure 2:
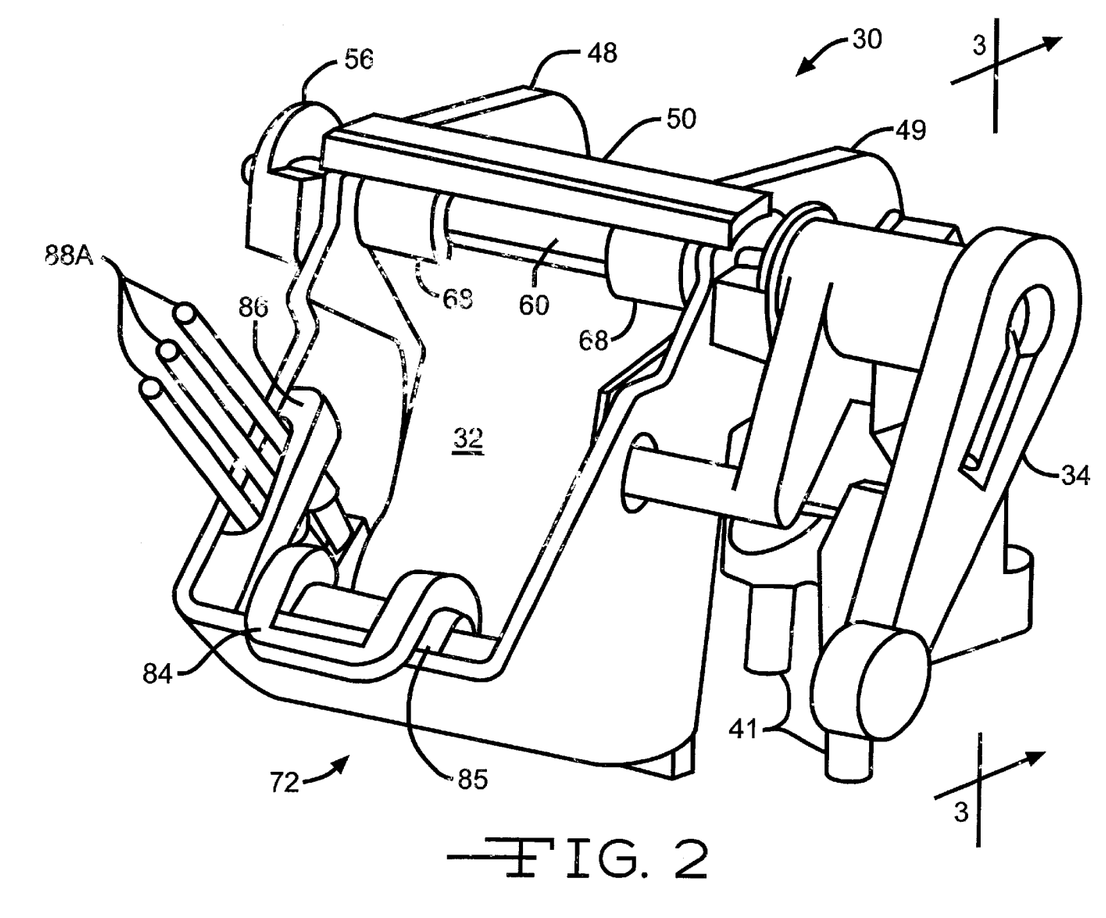
FIG. 2 is a perspective view of a pendulum assembly in accordance with the invention and which is included in the brake controller shown in FIG. 1.

Referring now to the drawings, there is shown in FIG. 1 a schematic diagram illustrating an electric brake system for a towed vehicle (not shown), shown generally at 10, which utilizes an electronic brake controller 11. The brake controller 11 is typically located in a towing vehicle (not shown), usually being mounted beneath the towing vehicle dashboard. When actuated, the controller 11 functions to supply an electric current through line 12 to energize electric brakes 13 and 14 which brake the wheels of the towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of brakes 13 and 14, the invention also can be applied to towed vehicles having more than two sets of brakes.

The towing vehicle typically includes a conventional hydraulic brake system 20 which is actuated when a brake pedal 21 is depressed by a vehicle driver. The brake pedal 21 is coupled to a brake light switch 22. When the brake pedal 21 is depressed, the switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a first line 26 through a circuit breaker 27 to the controller 11. Power is continuously supplied to the controller 11 through the first line 27. It will be appreciated that, while circuit breaker 27 is shown in FIG. 1, a fuse or other overcurrent protection device can be used. A second line 28 connects the brake light side of the brake light switch 22 to the controller 11. Thus, power also is supplied through the second line 28 to the controller 11 when the brake light switch 22 is closed.

The brake controller 11 is normally operated in an automatic mode with the towed vehicle brakes 13 and 14 being automatically actuated by the controller 11 when the towing vehicle brakes are actuated. The automatic mode is activated upon closure of the brake light switch 22. The present invention contemplates that the controller 11 includes an improved pendulum assembly 30 which generates a brake control signal, that is directly proportional to the towing vehicle deceleration. The controller 11 is responsive to the brake control signal to supply an electric current through line 12 to actuate the towed vehicle brakes. Thus, electric current is directly proportional to the braking force applied to the towing vehicle. The pendulum assembly 30 is located within an outer housing 31 of the controller 11. The pendulum assembly 30 includes a pendulum 32 which swings in response to the deceleration of the towing vehicle. As will be explained below, the brake control signal is proportional to the amount of pendulum swing. The pendulum assembly 30 also includes a leveling arm 34 which extends through a side wall of the controller outer housing 31.

In some instances, it may be desirable to actuate only the towed vehicle brakes 13 and 14. This may be desirable, for example, to stabilize the towed vehicle against vacillations or swinging caused by strong side winds. Therefore, the brake controller 11 also includes a manual mode of operation. Accordingly, a manual switch 36 is provided on the electronic controller 11 to allow the vehicle driver to actuate the towed vehicle brakes 13 and 14 without applying the towing vehicle brakes. Pressing the manual switch 36 initiates the manual mode of operation. The amount of electric current supplied to the towed vehicle brakes 13 and 14 is proportional to the displacement of the manual switch 36. If the manual switch 36 is pressed while the brake pedal 21 is depressed, the manual operating mode overrides the automatic operating mode.

Figure 3:
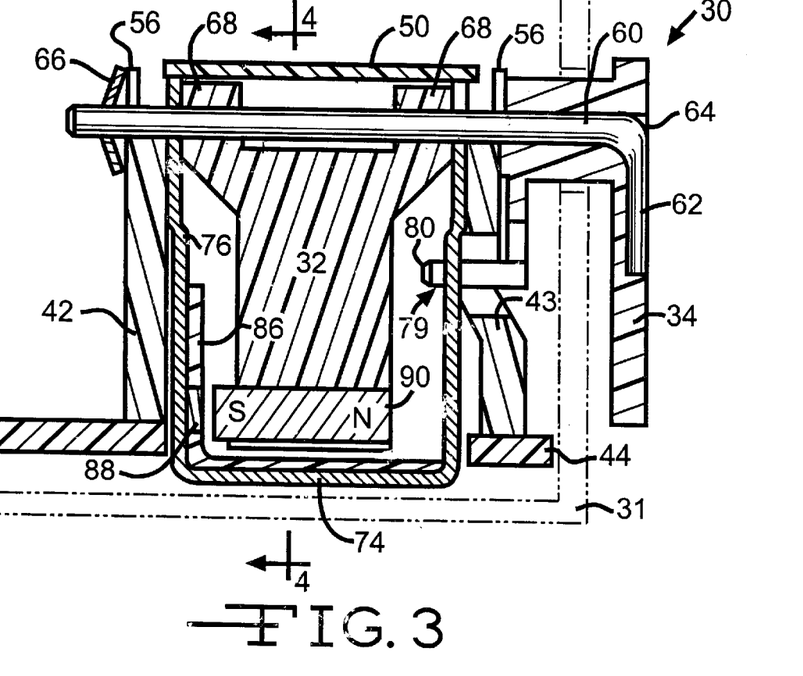
FIG. 3 is a sectional view of the pendulum assembly shown in FIG. 2 taken along line 3—3 in FIG. 2.
Figure 4:
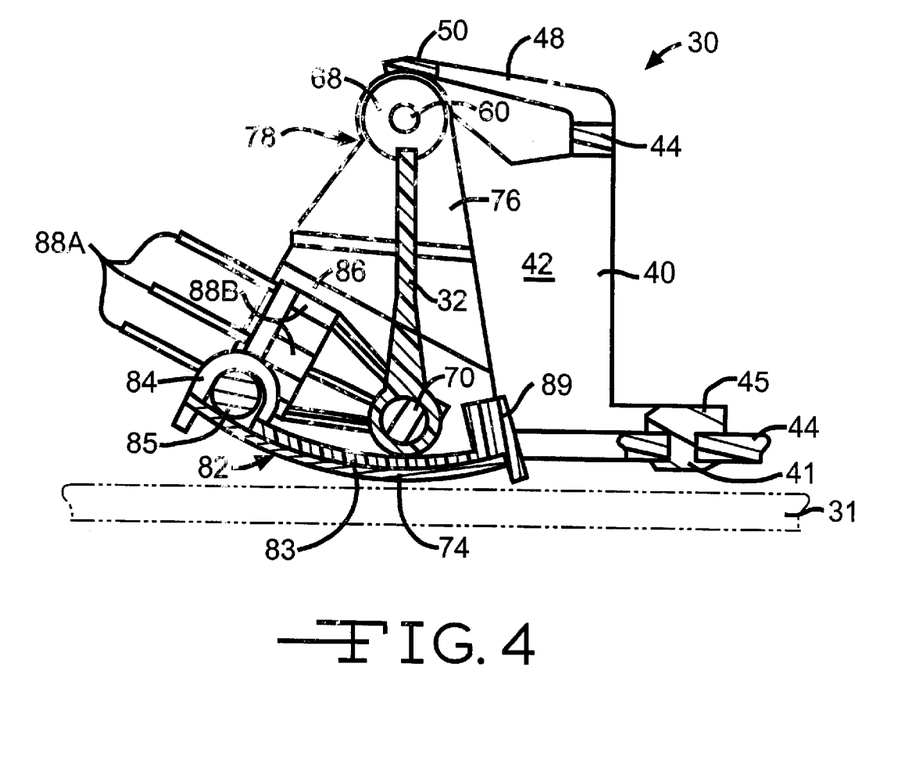
FIG. 4 is a sectional view of the pendulum assembly shown in FIG. 2 taken along line 4—4 in FIG. 3.

As shown in FIGS. 2 through 5, the pendulum assembly 30 includes an outer housing 40 formed from plastic. A plurality of stakes 41 extend from the bottom of the housing 40 and are received by corresponding apertures formed through a Printed Circuit Board (PCB) 44, as shown in FIG. 4. The ends of the stakes 41 are glued to the PCB 44 to secure the housing 40 to the PCB 44. Alternately, the ends of the stakes 41 are heated and then peened against the bottom surface of the PCB 44. The PCB 44 carries electronic components (not shown) which are responsive to the brake control signal to control the electric trailer brakes. The PCB 44 is mounted within the electronic brake controller outer housing 31, which is shown in phantom in FIGS. 3 and 4.

Figure 5:
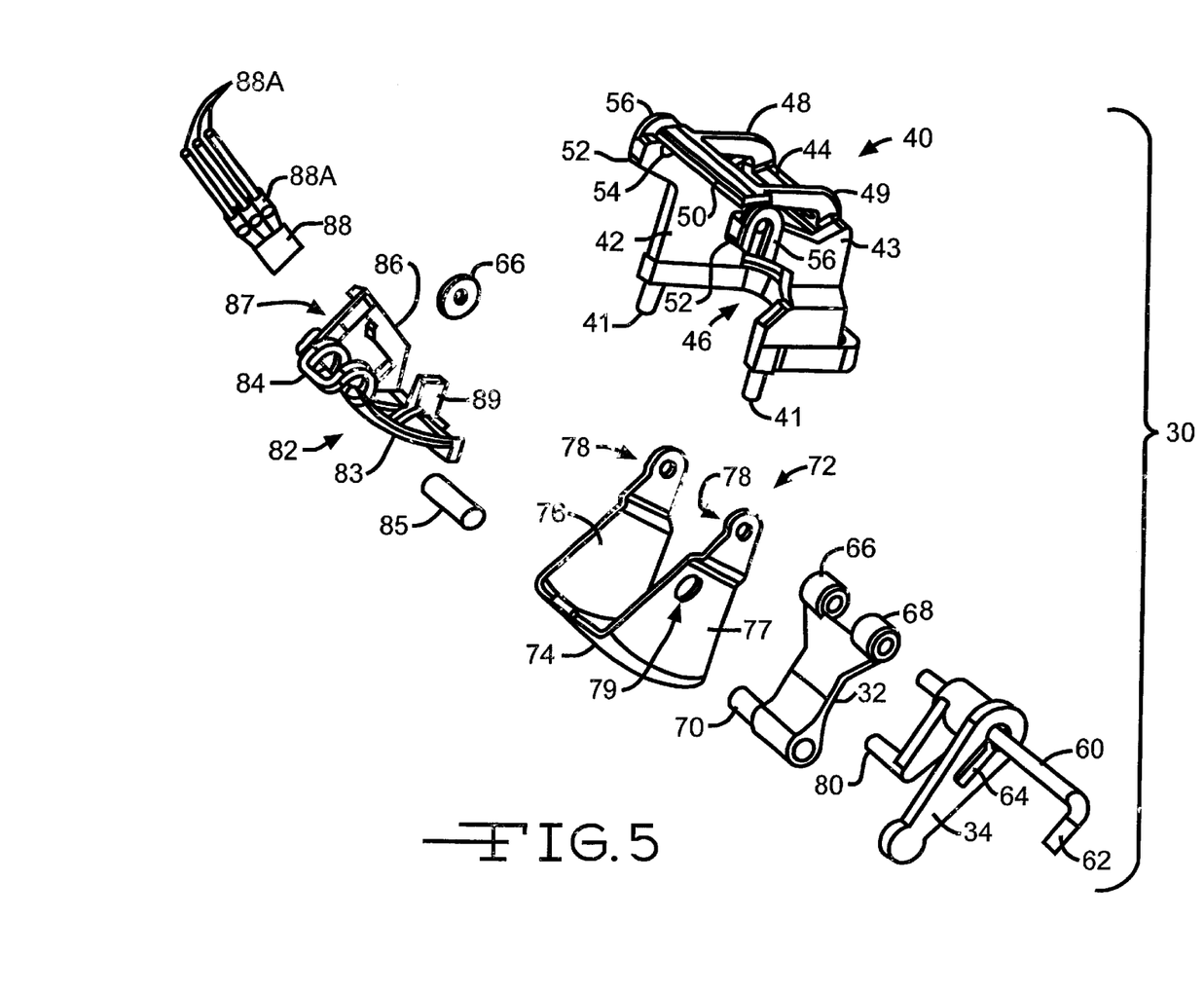
FIG. 5 is an exploded view of the pendulum assembly shown in FIG. 1.

The housing 40 includes left and right side walls, or members, 42 and 43, respectively, which are spaced apart by upper and lower cross members, 44 and 45, respectively. Thus, the rear of the housing 40 is open. As best seen in FIG. 5, a notch 46 is formed in the front surface of the right side wall 43, the purpose for which will be explained below. A pair of cantilevered arms, 48 and 49, extend from the upper portion of the side walls 42 and 43. A clamp bar 50 extends across the top of the housing 40 between the ends of the cantilevered arms 48 and 49. As best seen in FIG. 5, the upper portion of each of the housing side walls 42 and 43 extends forward to form a pair of pendulum supports 52. A semi-cylindrical pivot pin seat 54 is formed transversely across the upper surface of each of the pendulum supports 52. A pair of retaining hoops 56 are formed in the pendulum supports 52 adjacent to the outer ends of the seats 54.

The pendulum 32 is supported for swinging movement relative to the housing 40 by a pivot pin 60. The pivot pin 60 has a first end 62 formed at a right angle to the axis of the pin 60. The first end 62 of the pivot pin 60 is received in a slot 64 formed in the leveling arm 34 to secure the pivot pin 60 to the leveling arm 34. The pivot pin 60 extends through the retaining hoops 56 and is supported by the pivot pin seats 54 formed in the housing pendulum supports 52. The pivot pin 60 is retained upon the housing 40 by an annular retaining clip 66 which is pressed onto the end of the pivot pin 60 opposite from the first end 62.

The upper end of the pendulum 32 includes a pair of spaced apart bushings 68 which slidingly receive the pivot pin 60. In the preferred embodiment, the pivot pin 60 has a plated surface which is very smooth to minimize frictional forces between the pin 60 and the pendulum bushings 68. Accordingly, the pendulum 32 is free to rotate about the pivot pin 60. Additionally, while one retaining clip 66 is shown in FIG. 3, it will be appreciated that the invention also can be practiced utilizing two retaining clips (not shown). The two retaining clips cooperate with one another to assure that the retaining clips do not slide in an axial direction upon the pivot pin 60. Thus, the pendulum 32 is retained in the correct position relative to the other components of the pendulum assembly 30. The lower end of the pendulum 32 carries a pendulum permanent magnet 70.

The pendulum assembly 30 further includes a U-shaped bucket 72 formed from a ferromagnetic material. The bucket 72 includes an arcuate shaped lower wall 74 connected to a pair of spaced apart triangular shaped side walls 76 and 77. The side walls 76 and 77 have apertures formed in the upper ends thereof for receiving the pivot pin 60. The bucket 74 also has recesses 78 formed in the leading edge of each of the bucket side walls 76 and 77 immediately below the pivot pin apertures. The purpose for the recesses 78 will be explained below. The upper ends of the bucket sidewalls 76 and 77 are rounded. As best seen in FIG. 3, the pendulum 32 is suspended within the bucket 72 and the bucket 72 is, in turn, suspended between the housing sidewalls 42 and 43. It has been found that the magnetic attraction between the bucket 72 and the pendulum magnet 70 dampen movement of the pendulum 32 when the pendulum assembly 30 is subjected to road shocks.

A positioning aperture 79 is formed through the right side wall 77. The positioning aperture 79 receives the end of a crank 80 formed upon the leveling arm 34. As will be explained below, the crank 80 cooperates with the positioning aperture 79 to level the pendulum assembly 30. The clamp bar 50 is urged against the upper ends of the bucket side walls 76 and 77 by the cantilevered arms 48 and 49. Accordingly, the bucket 72 is frictionally retained in position relative to the housing 40 by the clamp bar 50. The pendulum bushings 68 have a smaller outside diameter than upper ends of the bucket sidewalls 76 and 77. Accordingly, the pendulum 32 does not contact the clamp bar 50, allowing the pendulum 32 to swing freely within the bucket 72.

A plastic carrier 82 is mounted upon the upper surface of the lower bucket wall 74. The carrier 82 includes an arcuate shaped base portion 83 which terminates in a cylindrical bracket 84. The bracket 84 receives and retains a permanent restoring magnet 85. The restoring magnet 85 repels the pendulum magnet 70 to urge the pendulum 32 toward its resting position. The restoring force increases in magnitude as the pendulum 32 swings further from its resting position. The quality of the restoring magnet 85 has been increased to make it more resistant to demagnetization. According the combination of the magnetic attraction between the restoring magnet 85 and the ferromagnetic bucket 72 and the frictional retaining force of the carrier bracket 84 is sufficient to retain the restoring magnet 85 in position. Accordingly, the need to apply an adhesive to the magnet 85, as was required to secure the magnet in prior art devices, is eliminated.

The carrier 82 also includes a side portion 86 which extends from the base portion 83 and has a notch 87 formed therein. The carrier side portion 86 is adjacent to the bucket left side wall 76. The notch 87 slidingly receives a Hall Effect Device 30 (HED) 88. The side carrier portion 86 cooperates with the bucket left side wall 76 to frictionally retain the HED 88 in the notch 87. A plurality of electrical leads 88A extend from the HED 88. Each of the leads 88A extends through a cylindrical length of electrically insulative material 88B which is heat shrunk onto the lead 88A. The insulative material 88B insulates the HED leads 88A from the bucket 72 and thereby prevents a short circuit. Use of the insulative material 88B eliminates the need to position a strip of insulative material between the HED leads 88A and the bucket, as was the practice with prior art pendulum assemblies. Thus, the assembly of the device is simplified. A pendulum stop post 89 extends from the rear of the carrier 82 to prevent rearward motion of the pendulum 32.

As the pendulum 32 swings from its resting position when the towing vehicle decelerates, the HED 88 generates a voltage proportional to the amount of pendulum movement. In order to achieve proper operation, it is necessary that the resting position of the pendulum 32 relative to the center of the HED 88 be adjusted, or "leveled", after the brake controller casing 31 has been securely mounted within the towing vehicle. Typically, the brake controller 11 is mounted upon, or under, the towing vehicle dashboard. The mounting location usually is not horizontal. Once the controller is mounted, the pendulum position is adjusted by moving the leveling arm 34. As explained above, movement of the leveling arm moves the bucket 74 relative to the pendulum assembly housing 40. Since the HED 88 is held against the left bucket wall 76 by the carrier 82, movement of the bucket 74 also moves the HED 88 relative to the pendulum 32. Typically the controller 11 includes a feedback device to assist the operator in leveling the controller after it is installed in the towing vehicle. For example, the controller 11 can include a light which is illuminated when the pendulum magnet 70 is positioned correctly relative to the HED 88.

The notch 46 formed in the left side of the pendulum assembly housing 40 provides for additional travel of the crank 80 while the open rear end of the housing 40 provides for additional travel of the bucket 74 in the rearward direction over prior art pendulum assemblies. Thus, a brake controller 11 which includes the improved pendulum assembly 30 can be installed over a greater range of mounting surface angles than prior art brake controllers. Furthermore, the recesses 78 formed in the leading edges of the bucket side walls 76 and 77 receive the clamp bar 50 and thereby increase the amount of bucket travel relative to the housing 40 in the forward direction. Additionally, as described above, the clamp bar 50 frictionally retains the bucket 72 in the leveled position. Thus, the magnet/HED relationship is maintained. Because the slot 87 in the carrier side portion 86 frictionally retains the HED 88; a step of gluing the HED 88 in place, which was required in the assembly of prior art pendulum assemblies, is eliminated.

Figure 6:
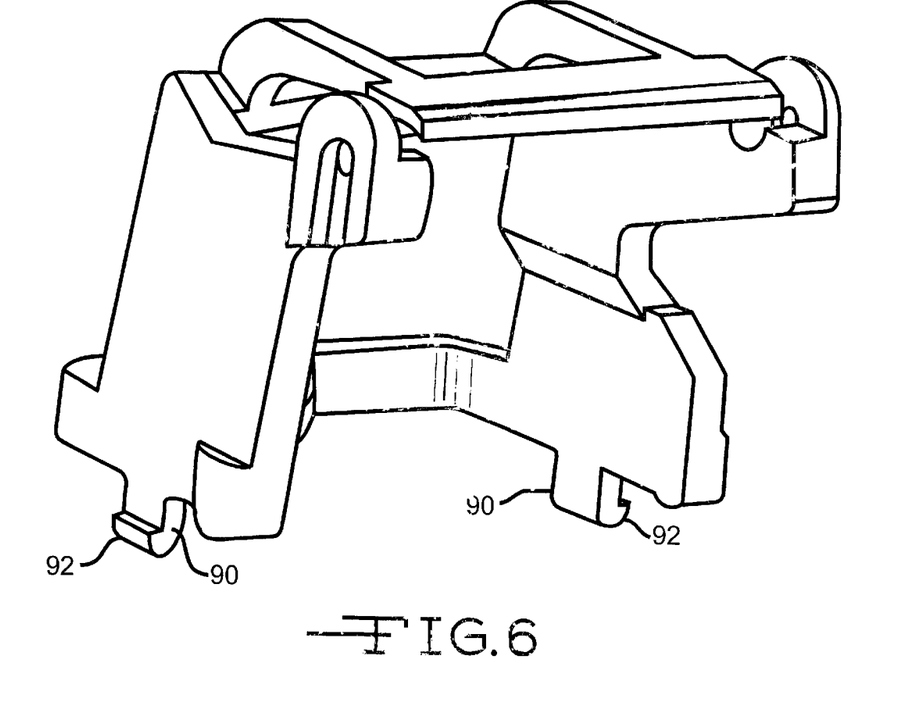
FIG. 6 is a perspective view of an alternative embodiment of the housing included in the pendulum assembly shown in FIG. 2.
Figure 7:
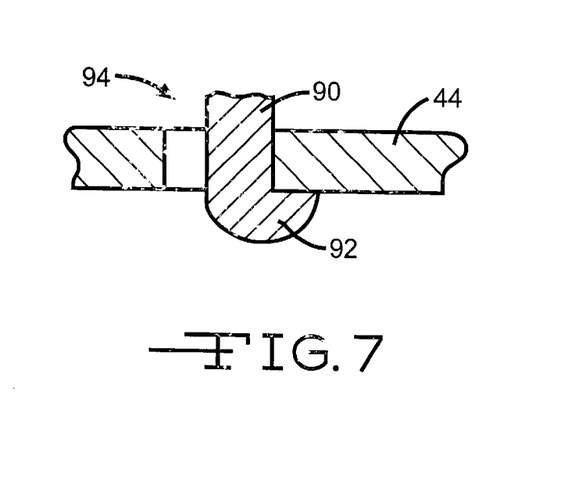
FIG. 7 is a sectional view illustrating the attachment of the housing shown in FIG. 6 to a printed circuit board.

An alternate embodiment of the pendulum assembly housing is shown in FIG. 6 where the stakes 41 shown in the preceding figures have been replaced by clips 90 which terminate in barbs 92. The ends of the clips 90 are arcuate shaped. As shown in FIG. 7, the clips 90 are received by corresponding slots 94 (one shown) formed through the PCB 44. As the clips 90 are pressed into the PCB slots 94, the clips 90 are urged in an inward direction by their arcuate shaped ends. Once the barbs 92 have passed through the slots 94, the resiliency of the plastic forming the housing urges the clips 90 in an outward direction causing the barbs 92 to engage the lower surface of the PCB 44 and thereby retain the housing and pendulum assembly upon the PCB 44. Thus, the alternate embodiment of the housing simplifies installation of the pendulum assembly in the brake controller 11 by eliminating the steps of gluing or heating and peening.

Further details concerning operation of the pendulum assembly 30 and the associated electronic brake controller are included in the above mentioned U.S. Pat. Nos. 4,721, 344, 4,726,627 and 5,620,236, which are incorporated herein by reference.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been illustrated and described as being utilized with an electric trailer brake controller, it will be appreciated that the invention also can be practiced with other devices. For example, the pendulum assembly can be utilized to measure vehicle deceleration for input to anti-lock and vehicle stability systems.

What is claimed is:

1. A device for sensing the deceleration of a vehicle comprising:

a housing adapted to be secured to the vehicle, said housing including a base portion and a pair of spaced apart support members extending from opposite sides of said base portion, said support members defining an open space therebetween;

a U-shaped bucket suspended between said housing support members within said open space between said support members, said bucket being pivotable about an axis;

a pendulum suspended within said bucket and pivotable about said axis; and a positioning device carried by said housing and connected to said bucket, said positioning device operable to rotate said bucket about said axis relative to said housing in one of a first direction or a second direction, said second direction being opposite from said first direction, whereby said bucket can be rotated sufficiently in either of said first or second directions within said open space between said support members such that at least a portion of said bucket extends beyond both of said housing support members.

2. A device for sensing the deceleration of a vehicle comprising:

a housing adapted to be secured to the vehicle, said housing including a pair of spaced apart supporting members;

a U-shaped bucket suspended between said housing support members and pivotable about an axis;

a pendulum suspended within said bucket and pivotable about said axis;

a positioning device carried by said housing and connected to said bucket, said positioning device operable to rotate said bucket about said axis relative to said housing in one of a first direction or a second direction, said second direction being opposite from said first direction, whereby said bucket can be rotated sufficiently in either of said first or second directions such that at least a portion of said bucket extends beyond both of said housing supporting members; and a crank connected to said bucket and operable to rotate said bucket relative to said housing and further wherein at least one of said housing support members has a recess formed therein, said recess receiving a portion of said crank whereby the amount of rotation of said bucket relative to said housing is enhanced.

3. The device according to claim 2 wherein said bucket includes a pair of spaced apart side members and further wherein a recess is formed in a leading edge of each of said bucket side members, said recesses receiving a portion of said housing whereby the amount of rotation of said bucket relative to said housing is enhanced.

4. The device according to claim 3 wherein said housing includes a cross member supported by a pair of arms, said arms extending from said housing support members, said cross member being urged by said arms against said bucket whereby said bucket is frictionally retained in a particular position relative to said housing.

5. The device according to claim 4 wherein a carrier is mounted upon said bucket, said carrier having a slot formed therein, said slot slidingly receiving and frictionally retaining a Hall Effect Device and further wherein a permanent magnet is carried by the end of said pendulum opposite from said pivot, said magnet cooperating with said Hall Effect Device, upon movement of said pendulum, to cause said Hall Effect Device to generate a voltage which is proportional to the deceleration of the vehicle.

6. The device according to claim 5 wherein said Hall Effect Device has a plurality of electrical leads extending therefrom and further wherein an electrically insulating material is heat shrunk onto said leads whereby said leads are electrically insulated from said bucket.

7. The device according to claim 5 wherein the device is mounted in an electric brake controller, said electric brake controller being attached to the vehicle, and further wherein said voltage generated by said Hall Effect Device upon deceleration of the vehicle is a brake control signal for controlling a set of electric wheel brakes, said electric wheel brakes being mounted upon a trailer adapted to be towed by the vehicle.

8. The device according to claim 7 wherein said electric brake controller has an outer housing having at least one aperture formed therethrough, said housing receiving the device with an end of said crank extending through said outer housing aperture, and further wherein an adjustment lever is formed upon said end of said crank whereby a vehicle operator can manipulate said adjustment lever to move said bucket relative to said housing to adjust the position of said Hall Effect Device relative to said pendulum magnet.

9. The device according to claim 8 further including a device for signaling the vehicle operator when said Hall Effect Device is correctly positioned relative to said pendulum magnet.

10. The device according to claim 8 wherein said pendulum housing is mounted upon a printed circuit board, said printed circuit board being disposed within said controller outer housing, said printed circuit board carrying electronic components for generating a current for actuating said trailer electric wheel brakes.

11. The device according to claim 10 further including at least one stake extending from said housing, said stake being received by an aperture formed through said printed circuit board and secured thereto by an adhesive.

12. The device according to claim 10 further including at least one stake extending from said housing, said stake extending through an aperture formed through said printed circuit board aperture with an end of said stake being peened against said printed circuit board to secure said housing to said printed circuit board.

13. The device according to claim 10 including at least one clip extending from said housing, said clip having an end formed as a barb, said clip being received by a slot formed through said printed circuit board with said barb extending through said slot and engaging a surface of said printed circuit board to secure said housing upon said printed circuit board.

14. A device for sensing the deceleration of a vehicle comprising:
 a housing adapted to be secured to the vehicle, said housing including a pair of spaced apart supporting members;
 a U-shaped bucket suspended between said housing support members and pivotable about an axis;
 a pendulum suspended within said bucket and pivotable about said axis;
 a positioning device carried by said housing and connected to said bucket, said positioning device operable to rotate said bucket about said axis relative to said housing;
 a pair of spaced apart arms extending from an end of each of said housing support members; and
 a cross member extending between said arms and being urged by said arms against said bucket to frictionally retain said bucket in a particular position relative to said housing.

15. The device according to claim 14 wherein said arms supporting said cross member are cantilevered from said housing support members.

16. The device according to claim 15 wherein said positioning device is operable to rotate said bucket about said axis relative to said housing in one of a first direction or a second direction, said second direction being opposite from said first direction, whereby said bucket can be rotated sufficiently in either of said first or second directions such that at least a portion of said bucket extends beyond both of said housing support members.

17. The device according to claim 15 wherein a carrier is mounted upon said bucket, said carrier having an open ended slot formed therein, said slot slidingly receiving and frictionally retaining a Hall Effect Device and further wherein a permanent magnet is carried by the end of said pendulum opposite from said pivot, said magnet cooperating with said Hall Effect Device, upon movement of said pendulum, to cause said Hall Effect Device to generate a voltage which is proportional to the deceleration of the vehicle.

18. A device for sensing the deceleration of a vehicle comprising:
 a housing adapted to be secured to the vehicle, said housing including a pair of spaced apart supporting members;
 a U-shaped bucket suspended between said housing support members and pivotable about an axis;
 a carrier mounted upon said bucket, said carrier having a slot formed therein;
 a Hall Effect Device slidingly received and frictionally retained within said carrier slot;
 a pendulum having a first end suspended within said bucket with said first end pivotable about said axis;
 a permanent magnet carried by a second end of said pendulum, said second end being opposite from said first end of said pendulum, said magnet cooperating with said Hall Effect Device upon movement of said pendulum to cause said Hall Effect Device to generate a voltage which is proportional to the deceleration of the vehicle; and
 a positioning device carried by said housing and connected to said bucket, said positioning device operable to rotate said bucket about said axis relative to said housing.

19. The device according to claim 18 wherein said housing includes a cross member supported by a pair of arms, said arms extending from said housing support members, said cross member being urged by said arms against said bucket whereby said bucket is frictionally retained in a particular position relative to said housing.

20. The device according to claim 18 wherein said positioning device is operable to rotate said bucket about said axis relative to said housing in one of a first direction or a second direction, said second direction being opposite from said first direction, whereby said bucket can be rotated sufficiently in either of said first or second directions such that at least of portion of said bucket extends beyond both of said housing supporting members.

* * * * *